May 5, 1925.
G. N. HEIN
1,536,386
OPERATING AND RETAINING MEANS FOR PIVOTALLY MOUNTED BODIES
Filed Oct. 8, 1923
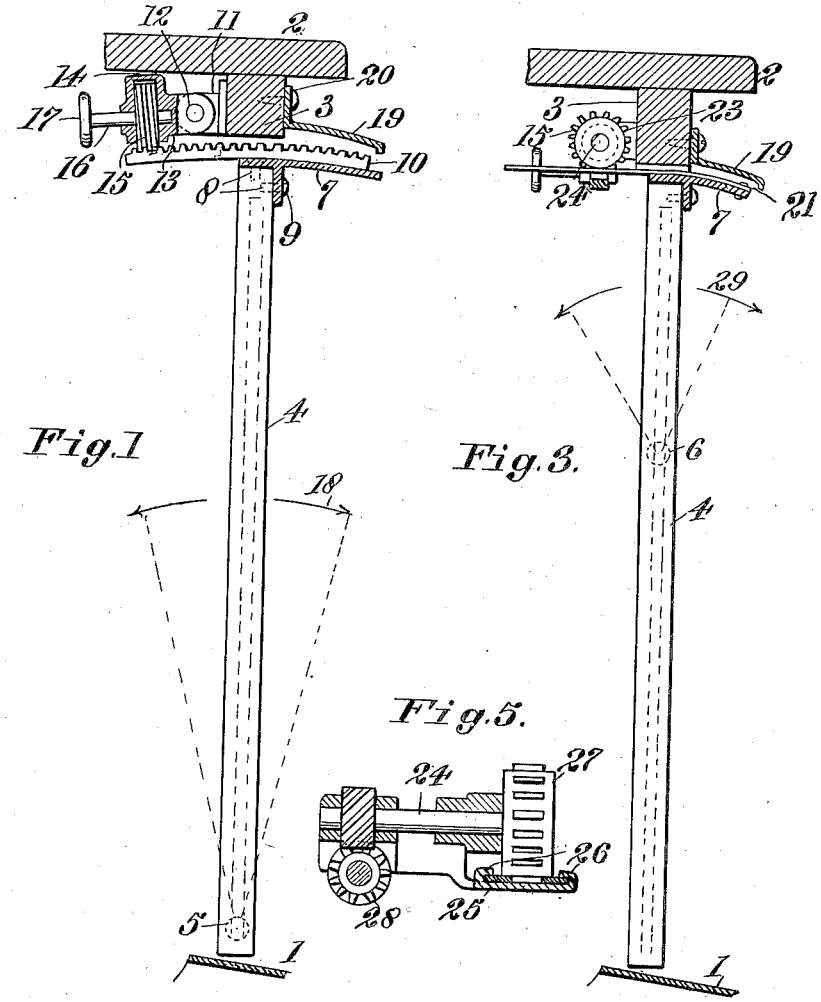
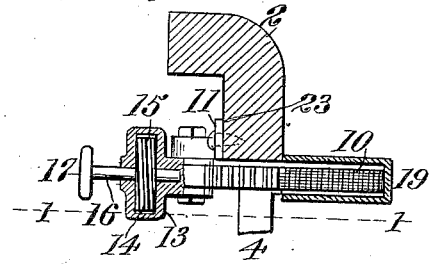
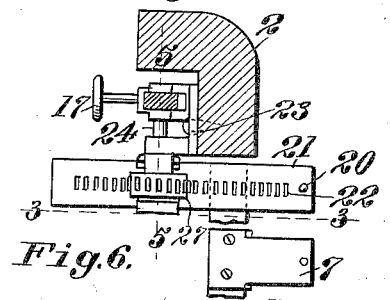
Inventor.
G. N. Hein Patented May 5, 1925.

1,536,386

UNITED STATES PATENT OFFICE.

GEORGE N. HEIN, OF SAN FRANCISCO, CALIFORNIA.

OPERATING AND RETAINING MEANS FOR PIVOTALLY-MOUNTED BODIES.

Application filed October 8, 1923. Serial No. 667,183.

*To all whom it may concern:*

Be it known that I, GEORGE N. HEIN, a citizen of the United States, residing at city and county of San Francisco, and State of California, have invented certain new and useful Improvements in Operating and Retaining Means for Pivotally-Mounted Bodies, of which the following is a specification.

The present invention relates to a mechanism for actuating of a closure pivotally mounted within an opening and for retaining the closure in its adjusted position. The embodiment of the invention is illustrated in connection with a pivotally mounted vehicle windshield and consists broadly in a recessed structure carried by the pivotally mounted body and disposed transversely of its edge and engageable by the teeth of an operating member positioned on the frame structure.

In adjusting and retaining pivotally mounted bodies in their adjusted position, particularly vehicle windshields, it is desirable to provide a single means adapted for one hand operation by the vehicle driver for accomplishing this purpose and the present invention is designed to fulfill these requirements.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

In the drawings, Fig. 1 is a transverse view in a vertical section on line 1—1 of Fig. 2 of one embodiment of the invention applied to a windshield fulcrumed at its lower edge for horizontal swinging movement.

Fig. 2 is a sectional view through the operating mechanism illustrated in Fig. 1.

Fig. 3 is a view similar to Fig. 1 on line 3—3 of Fig. 6 illustrating a preferred embodiment of the invention employed in connection with the windshield fulcrumed about midway of its length.

Fig. 4 is a view in sectional plan of the operating means in Fig. 2.

Fig. 5 is a sectional view on line 5—5 of Fig. 4.

Fig. 6 is a view in detailed plan of the member to which one end of the flexible operating member is secured.

In the drawings, 1 indicates a vehicle cowl and 2 the vehicle top, the present invention being illustrated in connection with a vehicle of the enclosed type. Between the cross member 3 supporting the top and the upper surface of the cowl 1 is disposed the closure member or shield 4 preferably of glass held within a frame. The shield in Fig. 1 is pivotally supported as at 5 at its lower end to fulcrum on a horizontal axis and the shield 4 in Fig. 3 is pivotally supported approximately midway of its length as at 6 to swing on a horizontal axis.

In the embodiment illustrated, Figs. 1 and 2, the upper end of the shield mounts a plate 7 projecting from the forward edge thereof are actuate in side elevation, the plate being provided with flanges 8 for engaging the front face and top side of the shield and through which pass attaching members 9. On its upper surface the plate supports a rack 10 also arcuate in side elevation and the rear end of the rack overhangs the rear face of the shield. To the rear face of the member 3 is attached a bracket 11 to which is pivotally connected through a horizontal fulcrum 12 a gear case 13 within a recess 14 in which is mounted a worm gear 15 carried by a shaft 16 which is provided with an operating handle 17. The gear intermeshes with the rack 10 and on its rotation is adapted to swing the shield in the direction of the arrows 18, Fig. 1, dependent on the direction of rotation of the handle. The fulcrum 12 permits the adjustment of the gear case to compensate for up and down movement between shield 4 and member 3. To protect the projecting portion of the rack 10 which extends in advance of the member 3 when the shield 4 is in aligned position to close the opening I provide an outwardly projecting protecting member 19, the flanged inner end of which is secured as at 20 to the outer face of the member 3.

In the embodiment illustrated in Figs. 3, 4, 5 and 6 I employ the same members 7 and 19 as are employed in the disclosure in Figs. 1 and 2 but to the forward end of the member 7 I secure as at 20 one end of a flexible operating member 21 which overlies and rests on the member 7 and extends rearwardly from the rear face of the shield 4. The flexible member 21 is provided with a row of perforations 22 as illustrated in Figs. 4 and 5. To the rear face of the member 3 is secured a bracket 23 within which is rotatably mounted a shaft 24 disposed at right angles to the movement of the shield. A portion of the bracket 23 is fashioned to provide a supporting guide surface 25 over which the member 21 operates and the sides of said portion are upwardly bent as at 26 to provide guide fingers beneath which the opposite edges of said flexible member 21 operate. Secured to the shaft 24 and overlying the member 25 is a toothed wheel 27 adapted to intermesh with the recesses 22 of the member 21. A worm and gear mechanism 28 extending at right angles rearwardly from the shaft 24 provides means for rotating the wheel 27 to cause the longitudinal movement of the member 21. In this construction it will be observed that the free end of the member 21 is acted on by the rotation of the wheel 27 and that the engagement of the teeth of the wheel with the recesses 22 of the member 21 will cause a pivotal movement of the shield in the direction of the arrows 29.

I claim:

1. In combination with an open frame, a closure therefor pivotally mounted therein, means for operating the closure, including a segmental part fixed to the closure edge to extend transversely thereof, an operating gear carried by the frame, and a recessed element carried by the segment with its ends projecting beyond opposite faces of the closure for engagement with the operating gear, whereby on the operation of said gear said closure is adapted for swinging on its fulcrum through the frame opening to either side.

2. In combination with an open frame, a closure therefor pivotally mounted therein, means for operating the closure, including a segmental part fixed to the closure edge to extend transversely thereof, an operating member carried by the frame, a flexible recessed element overlying the segment and secured at one end to one end of the segment and with which said operating member engages, and a guide beneath the operating member for receiving the free edges of the flexible element.

3. In combination with an open frame, a closure therefor pivotally mounted therein, means for operating the closure, including a pair of segmental parts fixed to adjacent edges of the frame and closure in cooperating relation, a flexible recessed element disposed longitudinally of the part carried by the closure and secured by one end thereto with its other end free, a guide cooperating with the segmental part fixed to the frame and within which operates the flexible element, and a toothed operated member carried by the part fixed to the frame and engaging the flexible element whereby on the rotation of said operating member the closure is caused to pivot on its fulcrum.

4. In combination with an open frame, a closure therefor pivotally mounted therein to swing therethrough, means for operating the closure including a flexible element disposed transversely of the closure and carried thereby with its ends extending beyond opposite faces of the closure, a guide associated with the frame and within which slides the free end of the element, and a member associated with the guide and engaging the element for operating the same.

5. In combination with an open frame, a closure therefor pivotally mounted therein, means for pivotally swinging the closure within the frame including a flexible element disposed transversely of the closure member with one end secured thereto and the other end lying free and projecting beyond one face of the closure, a guide cooperating with the frame for receiving the free end of the element and a member cooperating with the guide for engaging the element to operate the same.

In testimony whereof I have signed my name to this specification.

GEORGE N. HEIN.